United States Patent [19]
Costes

[11] 3,834,452
[45] Sept. 10, 1974

[54] REMOVABLE HEAD PRESSURE VESSEL, ESPECIALLY FOR BOILING-WATER REACTORS

[75] Inventor: Didier Costes, Paris, France

[73] Assignees: Commissariat A L'Energie Atomique; Electricite De France (Service National), both of Paris, France

[22] Filed: Apr. 18, 1972

[21] Appl. No.: 245,239

[30] Foreign Application Priority Data
Apr. 21, 1971 France .............................. 71.14145

[52] U.S. Cl. ...................... 165/47, 165/134, 52/224
[51] Int. Cl. ............................................. F24h 3/00
[58] Field of Search ......... 165/47, 162, 72, 75, 135, 165/136, 134; 52/224

[56] References Cited
UNITED STATES PATENTS
3,398,493 8/1968 Massey ................................ 52/224

Primary Examiner—Charles Sukalo
Attorney, Agent, or Firm—Cameron, Kerkam, Sutton, Stowell & Stowell

[57] ABSTRACT

The pressure vessel comprises a main portion having a top opening, a lid for the tight closure of the opening which is provided with a seal forming a leak-tight joint with the main portion and which is provided at the bottom portion thereof with a heat-insulating plug extending below the level of the leak-tight joint between the lid and the main portion. The heat-insulating plug has a continuous downwardly projecting peripheral skirt and the main portion comprises a trough placed in such manner that the skirt extends therein when the lid is in position.

9 Claims, 2 Drawing Figures

REMOVABLE HEAD PRESSURE VESSEL, ESPECIALLY FOR BOILING-WATER REACTORS

This invention relates to a pressure vessel of the removable-head type which is provided with thermal insulation and intended to contain saturated steam at a temperature which is considerably higher than that of the surrounding atmosphere, the high-strength wall of the pressure vessel being constructed of prestressed concrete, for example, and at least partly maintained in the vicinity of the ambient temperature.

Prestressed concrete pressure vessels of the above-mentioned type have already been constructed or proposed for containing nuclear reactor cores and also heat exchangers in some cases. A pressure vessel of this type has a prestressed concrete wall of substantial thickness and provided internally with a lining membrane or "skin" and a layer of heat-insulating material. This heat-insulating layer can be placed inside the leak-tight lining membrane which is cooled by a system of ducts carrying a circulation of fluid (this design solution being known as the "cold-skin" concept). The heat-insulating layer can also be placed outside the membrane, in which case it can be constituted by a layer of concrete having a composition such that its strength is little affected by temperature build-up (or so-called "hot-skin" concept). A description of the design concept just mentioned will be found in the communication entitled "An original solution : the hot-wall pressure vessel," as presented by J. Courbon and J. P. Merot at the Symposium of the European Agency for Nuclear Energy (Paris, May 20–22, 1968) to which reference can usefully be made.

The pressure vessels which are intended for certain types of reactors and especially for boiling-water reactors are provided with a large-section opening which can be closed by means of a leak-tight cover or lid. In a design of this type, the pressure-vessel body is usually given a cylindrical or prismatic shape having a vertical axis and provided with a top opening of large diameter which can be closed by means of the removable lid. The bottom portion of the lid is provided with a heat-insulating lining which has to be joined to the lining of the main portion of the pressure vessel, thus setting a problem which is difficult to solve. In fact, if provision is made for an annular space between the opposite surfaces of the main portion of the pressure vessel and the lid, this space gives rise to strong convective currents which are accompanied by condensation of steam and cause substantial heat losses.

In order to eliminate this phenomenon, it has been proposed to restore the continuity between the heat-insulating linings and the sheet-metal members which retain these latter. However, this makes it necessary for operating personnel to gain entry into the interior of the pressure vessel. This is not a practical expedient at the time of initial closure of the pressure vessel and necessarily results in exposure to radiations when opening the pressure vessel, after destruction of the welded joint between the sheet-metal members and the seal between the heat-insulating linings. In consequence, this possibility must apparently be ruled out.

The aim of the present invention is to solve the problem of convection currents without having recourse to any human intervention within the pressure vessel. To this end, the pressure vessel according to the invention comprises a main portion having a top opening, a lid for the tight closure of the opening which is provided with a seal forming a leak-tight joint with the main portion and which is provided at the bottom portion thereof with a heat-insulating extension plug extending below the level of the leak-tight joint between the lid and the main portion. The pressure vessel is primarily distinguished by the fact that said plug has a continuous downwardly projecting peripheral skirt and that said main portion carries a trough placed in such manner that the skirt extends therein when the lid is in position.

At the time of operation of the reactor, the trough is filled with condensed liquid which rises within the annular space between the lid and the main portion of the pressure vessel. Since said annular space can be reduced to a small value (a few millimeters), any convective motion of the liquid as well as heat-transfer processes within said space are thus reduced, thereby reconstituting the continuity of heat insulation of the pressure vessel.

According to a further aspect of the invention, this latter proposes a vessel providing pressure resistance and biological protection for a nuclear reactor of the boiling coolant type, comprising a main portion provided with a top opening and a lid for the tight closure of said opening, the lid and the main portion being provided with a leak-tight lining membrane covered with a layer of heat-insulating material, means being provided for maintaining a substantially stagnant layer of water between the adjacent surfaces of the heat-insulating linings of the lid and of the main portion. In this arrangement, the means for retaining the heat-insulating material can be designed so as to permit the flow of liquid into the mass of material.

A better understanding of the invention will be gained from the following description relating to the pressure vessel of a boiling-water reactor which constitutes one mode of application of the invention and to an alternative embodiment which are given by way of non-limitative example, reference being made to the accompanying drawings, wherein.

Figure 1:
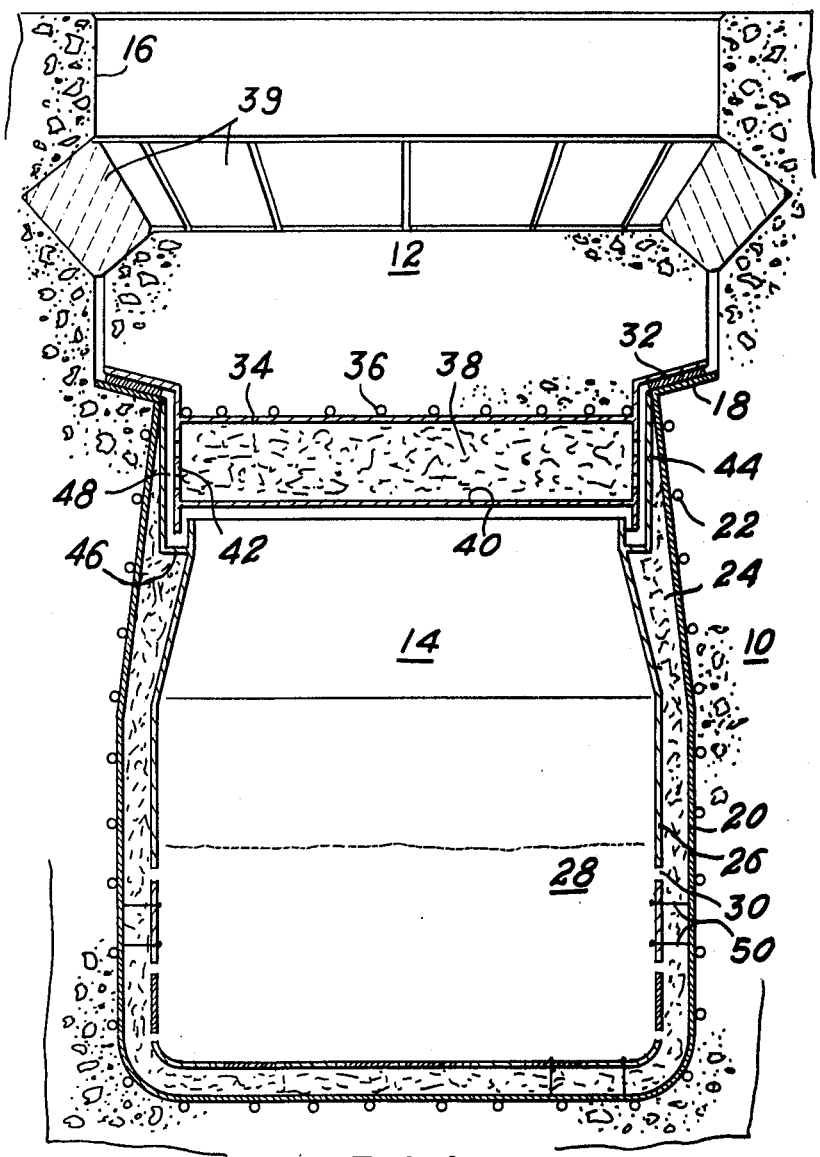
FIG. 1 is a diagrammatic view taken along the vertical mid-plane of a pressure vessel having a "cold" skin or lining membrane.

The pressure vessel illustrated in FIG. 1 comprises a main portion 10 and a lid 12. The main portion 10 comprises a bottom end and a shell having a cylindrical or polygonal external transverse section. Said main portion delimits an internal chamber 14 which opens into the top portion of the pressure vessel through a passageway 16, the diameter of which is of the same order as the diameter of the chamber 14. The shell of the main portion is provided between the passageway 16 and the chamber 14 with a corbel having a conical top face 18 inclined at a small angle of slant and constituting a bearing seating for the lid 12. A leak-tight lining membrane 20 provides an internal covering for the end and the shell of the main portion 10 and extends at least up to the seating 18. A system of cooling tubes 22 through which water is circulated and which are applied against the exterior of the lining membrane 20 serves to maintain the temperature of this latter at a relatively low value of the order of 60°C, for example. There is interposed between the membrane 20 and the chamber 14 a layer 24 of heat-insulating material which is retained by a bell-casing 26. Said bell-casing is provided with openings 30 in the portion which is immersed in the mass of water 28 in liquid phase. The water passes through these openings and penetrates into the entire heat-insulating material 24 while remaining in liquid phase by reason of the fact that it is cooled across the leak-tight lining membrane 20. By way of example, the heat-insulating material is constituted by a fabric of stainless steel mesh. The flow of water which passes into this material and fills the pores of this latter is slowed-down and therefore does not have any unfavorable action on the insulating material while ensuring hydrostatic transmission of pressures.

The bell-casing 26 need not be continuous below the free surface of the water within the chamber 14 but can be constituted by juxtaposed plates attached separately to the lining membrane 20 by means of studs 50, two of which are shown in the figure.

The lid 12 of the pressure vessel is usually constructed also of prestressed concrete. The underside of said lid has an annular face corresponding in shape to the seating 18 on which said face is supported by means of a seal 32 formed of elastomer, for example. In the same manner as the internal face of the main portion, the underface of the lid is provided with a leak-tight lining membrane 34 cooled by a bank of tubes 36 which carry a circulation of water. The lid 12 is held against its seating by means of bearing elements which are shown diagrammatically at 39 and can be constituted in different ways: in particular, use can be made of variable-pressure jacks which maintain the seal 32 in continuous compression, high-power springs which perform the same function, or simple wedges which entail the need to ensure that said seal 32 is capable of withstanding relative displacements of the lid and of the seating.

In the zone which is located internally of the seal 32 in the radial direction, the central portion of the underface of the lid 12 is adapted to carry a heat-insulating plug. The plug which is illustrated in FIG. 1 is composed of a layer 38 of fibrous or porous heat-insulating material retained by a solid bottom plate 40 and by a lateral skirt 42 which extends downwards beneath the plate 40.

The bell-casing 26 which retains the layer 24 of heat-insulating material in turn constitutes, in conjunction with a tubular collar 44 (in which the skirt 42 is inserted) and a flange 46, a trough having a depth such that the skirt 42 extends therein when the lid 12 is in position. When the reactor is started-up, the steam condenses within the annular space 48 formed between the plug and the tubular collar 44 (by reason of the cooling effected by the banks of tubes 22 and 36 in the top portion of said space). Water in liquid phase thus fills the trough and the annular space 48 which is located between the skirt 42 and the tubular collar 44. This mass of water is retained by the pressure prevailing within the chamber 14 and exerted on the free surface between the skirt and the internal flange of the trough, and prevents any upward flow of steam. Since the annular space 48 has a small thickness, any convective motion of the water therein is slowed-down and heat-transfer processes within the space are accordingly reduced. The water within said annular space thus ensures continuity of the heat insulation.

In the embodiment which is illustrated in FIG. 1, the skirt 42 is pierced above the plate 40 by holes which enable the water contained in the annular space to penetrate into the layer 38 of heat-insulating material.

Figure 2:
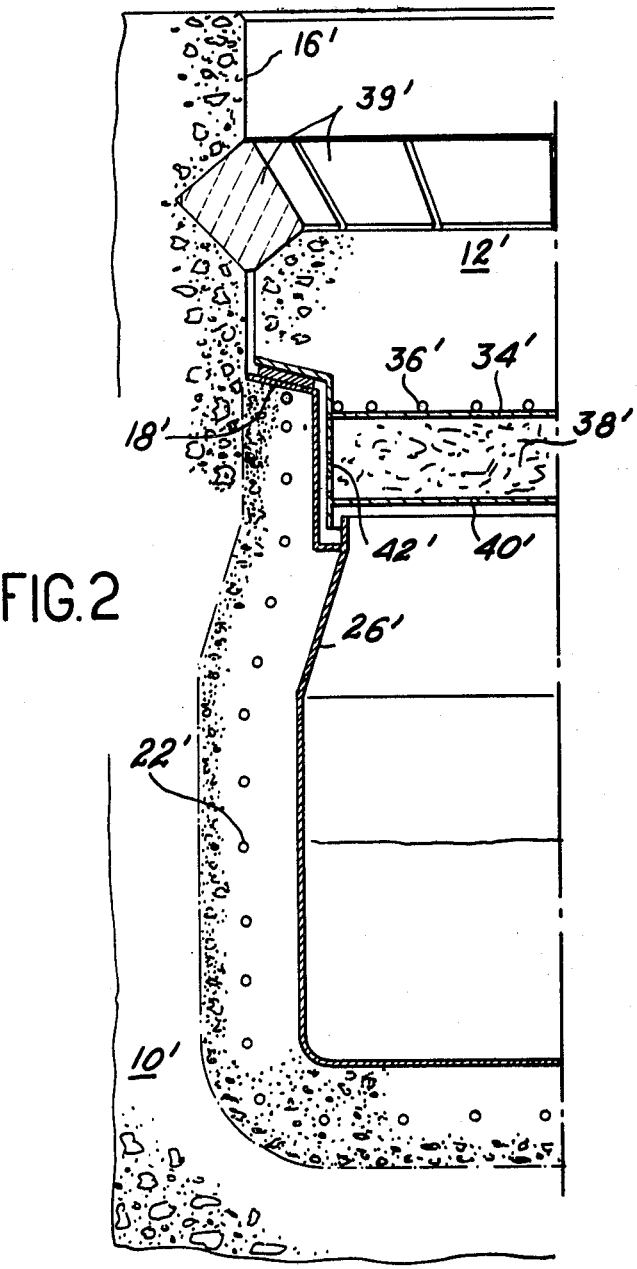
FIG. 2 is a sectional view taken along the vertical mid-plane of a pressure vessel having a "hot" lining membrane.

The embodiment which is illustrated in FIG. 2 differs from the foregoing essentially in that the leak-tight lining membrane of the main portion of the pressure vessel is "hot." There is again shown in the case of FIG. 2 (in which the elements corresponding to those of FIG. 1 are provided for the sake of enhanced simplicity with the same reference numeral followed by the prime index) a main portion 10' and a lid 12' which is held in position by means of wedges 39'. The lid is provided with a bottom leak-tight lining membrane 34' which is cooled by a bank of tubes 36' and extended by a bottom plug constituted by a layer 38' of heat-insulating material which is retained by a plate 40' and a lateral skirt 42'. But in the embodiment of FIG. 2, in contrast to the embodiment of FIG. 1, the trough is delimited by a flange of the lining membrane 26'. The system of tubes 22' through which the coolant water is circulated is placed within the interior of the mass of concrete and is separated from the membrane by heat-insulating concrete except in the immediate vicinity of the seating 18' of the lid 12'. The functions of the trough and of the lower extension of the skirt 42' nevertheless remain identical with those of the corresponding elements of the pressure vessel shown in FIG. 1.

It can be mentioned by way of example that, in the case of a boiling-water reactor with an output of 1,000 MW (electrical), the internal chamber of which has a diameter of the order of 5 m, it will usually be found necessary to adopt a plug 38 having a thickness of approximately 20 cm and separated from the tubular collar 44 by a radial clearance of a few millimeters.

It is readily apparent that the invention is not limited to the embodiments described and illustrated by way of example and extends to alternative forms of either all or part of the arrangements described which remain within the definition of equivalent means.

What we claim is:

1. Thermal insulation apparatus for a concrete caisson for a boiling water nuclear reactor comprising a concrete caisson, an internal cavity of revolution around a vertical axis in said caisson containing a boiling water coolant, an upper opening for said cavity in said caisson, cooling means for maintaining said caisson at a temperature less than the temperature of the boiling water coolant in said cavity, a cover for closing said opening of said cavity, a bearing surface on said caisson adjacent said opening supporting said cover, an annular sealing member mounted between said cover and said bearing surface, and an axial extension carried by said cover engaging in said cavity of said caisson, a sealing metallic surface on said extension, a lower retaining plate spaced from said surface, insulating means for said extension between said surface and said plate for maintaining said extension at a temperature less than the temperature of the boiling water refrigerant in said cavity, said extension being disposed below said sealing member, a cylindrical skirt coaxial with said cavity carried by said extension, a cylindrical ring parallel to said skirt connected to the wall of said caisson, a trough located at the bottom of said cylindrical ring receiving the end of said skirt, said ring, said trough and said skirt defining a narrower annular space receiving an insulating body of condensed liquid coolant.

2. Apparatus as described in claim 1, including a cooling circuit for circulation of a coolant in said extension adjacent said sealing surface.

3. Apparatus as described in claim 1, said cylindrical skirt including openings into said insulating means in said extension.

4. Apparatus as described in claim 10, said sealing mem-er including an elastomeric joint, a truncated conical surface on said cover engaging said bearing surface receiving said sealing member, and means carried by said cover applying said cover onto said sealing member and onto said surfaces.

5. Apparatus as described in claim 4, said means being pressure screws maintaining said sealing member in permanent compression.

6. Apparatus as described in claim 1, said cavity of said caisson including a sealing lining, insulating material adjacent said lining, a metallic grid holding said insulating material against said lining and in contact with the refrigerant in said cavity, and said cooling means including a cooling circuit in said caisson adjacent said lining.

7. Apparatus as described in claim 6, including openings in said metallic grid, admitting the coolant in said cavity into said insulating material on said lining.

8. Apparatus as described in claim 6, said metallic grid including beneath the coolant in said cavity juxtaposed plates independently secured to said lining by studs passing through said insulating material to said lining.

9. Apparatus as described in claim 1, said cavity in said caisson being lined with a metallic layer in direct contact with the coolant in said cavity, said refrigerating means including a cooling circuit in said caisson adjacent said metallic layer, said layer at its upper part including said cylindrical ring and including an internal rim forming said trough.

* * * * *